United States Patent [19]

Mayer et al.

[11] Patent Number: 5,249,199

[45] Date of Patent: Sep. 28, 1993

[54] METHOD AND APPARATUS FOR REDUCING SPURIOUS NOISE LEVELS IN AN AUDIO SYSTEM

[75] Inventors: Glenn N. Mayer, Elgin; John Snick, Algonquin; Randy L. Eki, Lake Zurich, all of Ill.

[73] Assignee: Motorola, Inc., Schaumburg, Ill.

[21] Appl. No.: 968,805

[22] Filed: Oct. 30, 1992

[51] Int. Cl.⁵ .............................................. H04K 1/00
[52] U.S. Cl. ...................................... 375/1; 380/35; 380/48
[58] Field of Search ................ 375/1; 380/34, 48, 35, 380/49; 455/33.2; 340/825.52

[56] References Cited

U.S. PATENT DOCUMENTS

| | | | |
|---|---|---|---|
| 4,667,191 | 5/1991 | Comroe et al. | 340/825.52 X |
| 4,977,577 | 12/1990 | Arthur et al. | 375/1 |
| 5,003,629 | 3/1991 | Ness-Cohn et al. | 455/33.2 |
| 5,109,390 | 4/1992 | Gilhousen et al. | 375/1 |
| 5,146,958 | 11/1992 | Omura | 375/1 |
| 5,148,477 | 9/1992 | Ito | 375/1 X |

*Primary Examiner*—Tod R. Swann
*Attorney, Agent, or Firm*—James A. Coffing

[57] ABSTRACT

An audio system (600) typically includes an audio signal processor (610), a controller (607) for controlling data signals, and a peripheral data source (613). The audio signal processor (610) exchanges information with a remote audio device (603) via a communication resource (605). A method of reducing spurious noise levels on the communication resource (605) includes generating a timing signal (400) having a period and randomly altering the period (409, 411, 413) of the timing signal (400) between a first predetermined value and a second predetermined value. The randomly altered timing signal are then used to effect control of the data signals, while providing a reduced level of spurious noise on the communication resource (605).

10 Claims, 2 Drawing Sheets

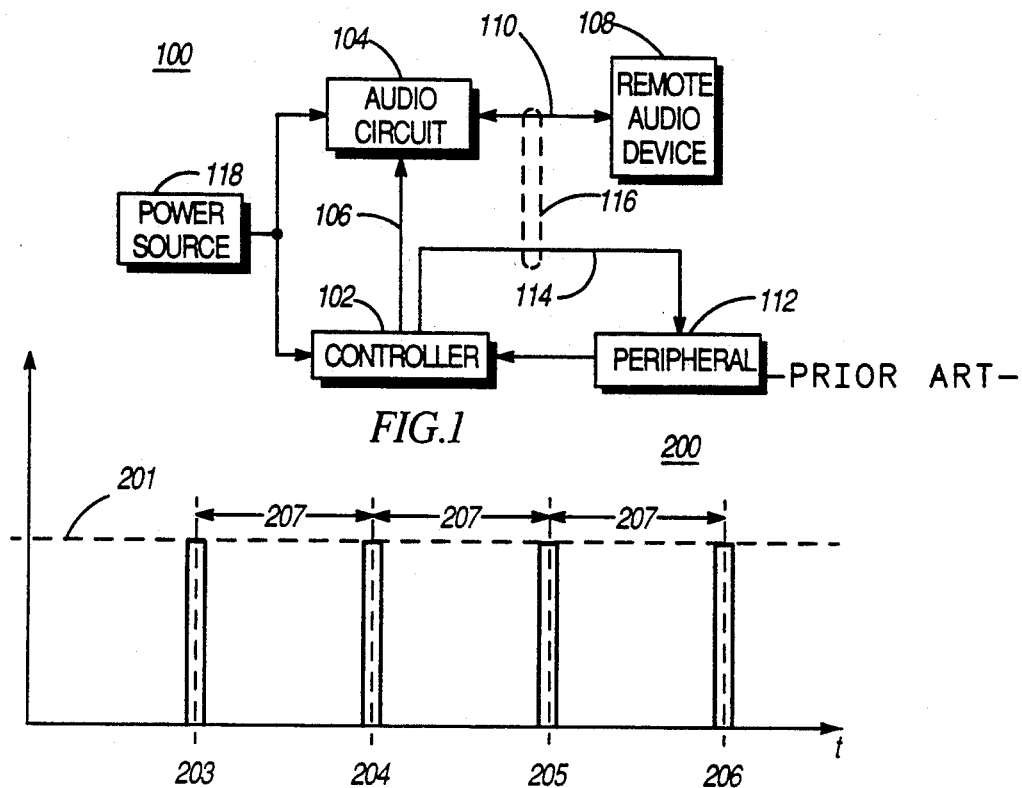
FIG.1 —PRIOR ART—
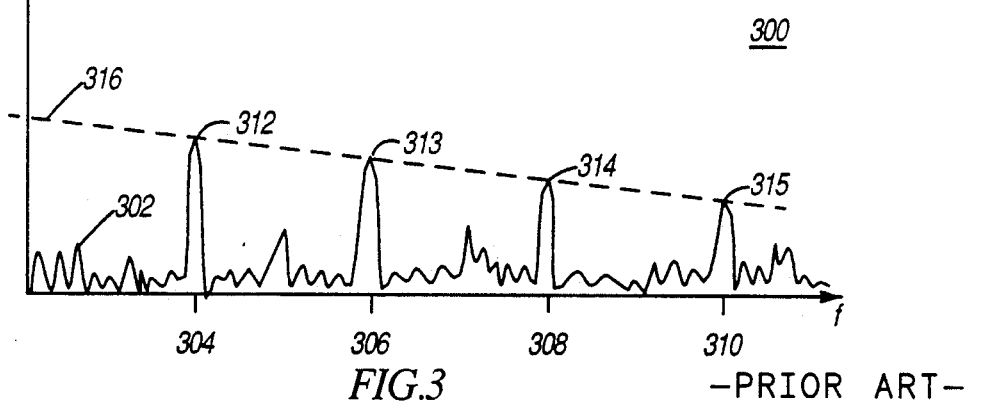
FIG.2 —PRIOR ART—
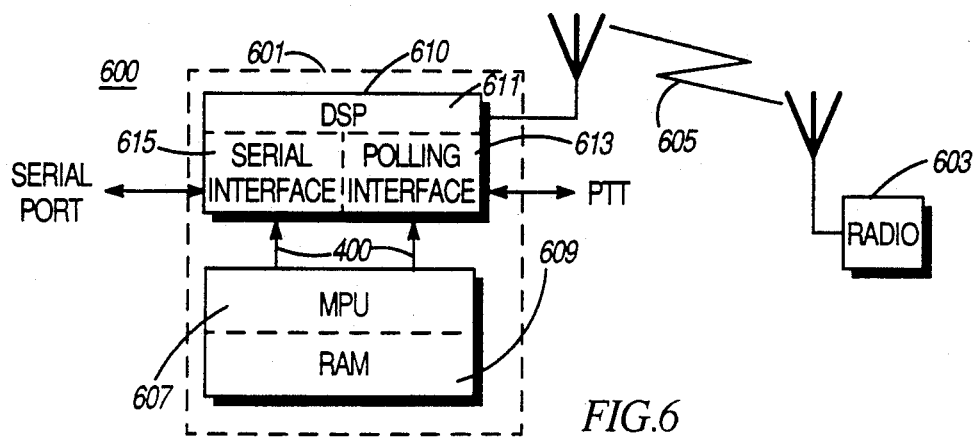
FIG.3 —PRIOR ART—
FIG.6

METHOD AND APPARATUS FOR REDUCING SPURIOUS NOISE LEVELS IN AN AUDIO SYSTEM

FIELD OF THE INVENTION

The present invention relates generally to audio systems and includes, but is not limited to, such systems which rely on timing signals to control the exchange rate of digital information within the system.

BACKGROUND OF THE INVENTION

Audio systems which receive, process, and transmit digital information are well known in the art. A radio communications system, i.e., one type of audio system, is typically used to exchange information between two remote devices, e.g., a base station and a radio. The transmission medium can be any one of a number of well known transmission schemes, for both wireless and wireline implementation. Typical schemes include conventional frequency modulation (FM), time division multiple access (TDMA), and a wide range of encrypted signal modulation schemes used in the secure communications market.

FIG. 1 shows an exemplary prior art audio system 100. Audio system 100 comprises a controller 102 which controls the timing of data signals being processed by audio circuit 104, via timing signal 106. Audio circuit 104 processes audio signals and communicates with remote audio device 108, via communication resource 110. [It should be noted that audio system 100 might be a sterophonic system wherein remote audio device 108 might be a simple transducer (e.g., speaker), and the communication resource 100 is a simple wireline. Additionally, audio system 100 might be a digital radio communications system which utilizes a wireless communication resource, e.g., radio frequency (RF) channel as discussed above, to exchange RF signals between audio circuit 104 and remote audio device 108 (e.g., subscriber radio)].

Audio systems of this type typically require many different control signals which allow the system components to cooperate and exchange information signals among them. Signalling-intensive environments, however, often produce an undesirable level of noise on the communication resource. This noise may have an adverse effect on the information which is being exchanged over the communication resource. As one example, a peripheral device such as peripheral 112 may require a timing signal from controller 102, which signal may be carried via a printed circuit trace 114. Circuit trace 114, if long enough, behaves much like an antenna—from which electromagnetic energy might radiate (generally depicted by reference number 116). This radiation is a common source of noise interference on communication resource 110.

Another noise contributing source is found in a device that is shared in common by two or more devices. For example, power source 118 shown in FIG. 1 is common to controller 102 and audio circuit 104. In particular, if each of the common devices are drawing current from power source 118 at substantially the same time, the resultant power surge might cause an undesirable noise spike in the response for the communication resource 110.

Yet another source of spurious noise contribution on the communication resource involves the use of digital control, or timing, signals generated by controller 102 to control data signals being exchanged between external data sources and the audio signal processing circuitry within audio circuit 104. An example of such a timing signal is shown in FIG. 2, which generally depicts magnitude (e.g., voltage, current) versus time graph for such a timing signal. Timing signal 200 has a magnitude 201 and is generated by the controller periodically at times 203-206. Period 207 is typically fixed according to a required timing interval for the device being controlled by the signal.

FIG. 3 shows a frequency response characteristic curve for the communication resource. Response curve 300 is shown with noise floor 302 and is meant to be illustrative of a typical frequency response characteristic at any given time on communication resource 110. Frequency 304 corresponds with the frequency of timing signal 200 (i.e., the reciprocal of period 207, expressed in Hz). As illustrated by curve 300, noise level 312 is substantially higher than noise floor 302, and is generally characterized as a noise spur, or spike. Similarly, at frequency 306 (the lowest order harmonic of the frequency of timing signal 200), noise level 313, while less than noise level 312, is still substantially higher than noise floor 302. Likewise, at frequencies 308, 310 (the second and third lowest harmonics of timing signal 200, respectively) exhibit similar spurious noise levels. The resultant peak noise level curve 316 is typically a decaying function of noise level versus frequency. That is, at the higher order harmonics of the timing signal, the spurious noise levels will be indistinguishable from those levels which make up noise floor 302. Accordingly, the information being exchanged anywhere below frequency 310, for example, might be subject to inaccuracies based on the level of noise present on the communication resource at any given time.

There exists a need, therefore, for an audio system that uses timing signals to control data being exchanged within that system, that is not constrained by the shortcomings of the prior art. In particular, a system that did not, through its own control signalling, unnecessarily contribute to the noise level present on the communication resource, would be an improvement over the prior art.

BRIEF DESCRIPTION OF THE DRAWINGS

FIG. 1 shows an audio system which is well known in the prior art;

FIG. 2 shows a timing diagram depicting a timing signal used in the audio system of FIG. 1;

FIG. 3 shows a frequency response characteristic curve for the communication resource shown in the audio system of FIG. 1;

FIG. 6 shows a radio communication system that may employ the timing signal shown in FIG. 4, in accordance with the present invention;

DETAILED DESCRIPTION OF THE PREFERRED EMBODIMENT

The present invention solves the problem created when a substantially periodic timing signal is required to control data signals in an audio system. In particular, by pseudo-randomly altering the period of the timing signal in question, the noise energy created by the timing signal pulse can be spread over a wider range of frequencies, thereby resulting in spurious noise levels whose peak magnitude is reduced. By doing this, the noise levels that are attributable to the timing signal create significantly less interference problems with the information being exchanged on the communication resource, (e.g., RF channel, wireline).

Figure 4:
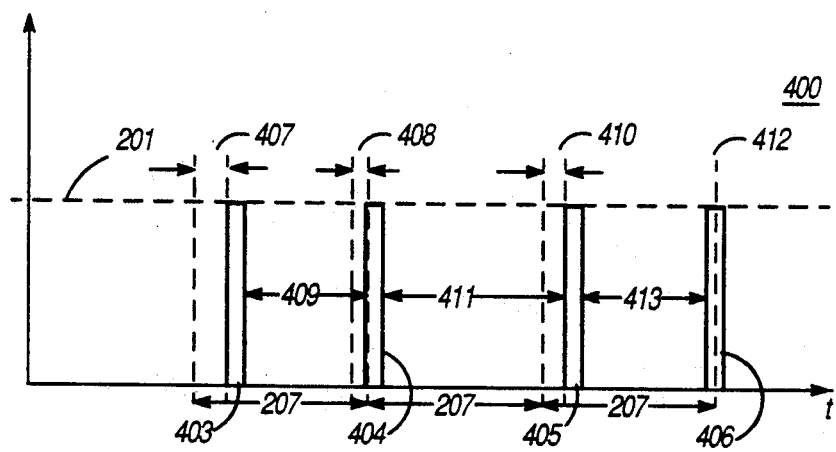
FIG. 4 shows a timing diagram depicting a timing signal, in accordance with the present invention.

FIG. 4 shows a timing diagram depicting a timing signal 400, in accordance with the present invention. Timing signal 400, like timing signal 200, has a magnitude 201, and a nominal period value 207. Unlike timing signal 200, however, timing signal 400, e.g., comprising timing pulses 403–406, has a period which is altered by randomly offsetting subsequent timing pulses by a small amount from the nominal period value 207. As an example, timing pulse 403 might be randomly offset by a time 407. Subsequent timing pulse 404 is randomly offset by a time 408, resulting in a period 409 which is somewhat smaller than nominal period value 207. Similarly, timing pulse 405 is offset from the time interval corresponding with nominal period value 207 by a time 410, resulting in a subsequent period 411. Likewise, period 413 is derived when timing pulse 406 is generated at a time 412, which might be substantially co-incidental, or aligned, with the nominal timing interval corresponding to nominal period value 207. [Note that alignment may occur at random, or according to a predetermined schedule, as later described.]

It should be noted that the degree of randomness, for purposes of carrying out the preferred embodiment of the invention, is of limited importance. That is, provided that a minimum level of randomness is used, the period of the timing signal need not be random in the strict statistical sense. It is only important that the periods are offset enough to prevent the undesired additive effect of the noise energy imparted on the communication channel. In the preferred embodiment of the invention, the benefit of randomness in the timing signal pulsing is derived using a pseudo-random technique. That is, a predetermined set of numbers are arranged in a random sequence between a predetermined lower limit and a predetermined upper limit.

In this manner, the numbers can be chosen so as to meet other system objectives, such as other time-keeping requirements. The system clock, for example, which is used as the basis for a substantial number of independently timed events, can be accurately maintained over time during periods of pseudo-random signalling. That is, by occasionally re-aligning the randomly altered timing signal with the system clock, the system clock is prevented from drifting from real time. This might be accomplished by selecting a predetermined number—'n'— pseudo-random numbers such that their sum is exactly the product of 'n' and the nominal timing signal period. Additionally, the lower and upper limits are carefully chosen so as to provide an acceptable performance level for the device being controlled (e.g., a polling device, supra). In a preferred embodiment, for example, the foregoing objectives are met by randomly selecting from 16 numbers whose sum is exactly 160 (e.g., for a nominal period value of 10 milliseconds). Further, the lower- and upper-limits are selected at 90 percent and 110 percent, respectively, of the nominal period value (i.e., for a range of nine and 11 milliseconds). Accordingly, the randomly altered timing signal and the real-time system clock are re-aligned every 16 pulses of the timing signal, independent of the random order in which they are used to alter the period of the timing signal. [It should be noted that the present invention contemplates the use of a much wider range of nominal period values (e.g., 10 microseconds to 100 milliseconds), as well as a greater percentage deviation from the nominal (e.g., ±five-20 percent). The foregoing ranges are limited by the application and the noise requirements thereof.]

Figure 5:
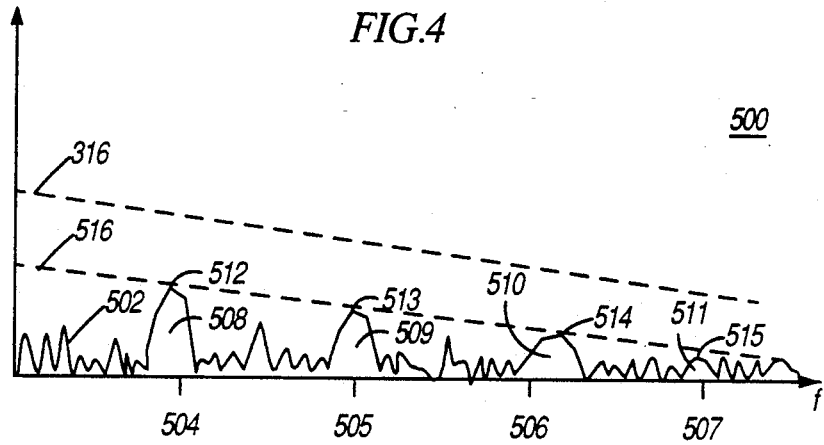
FIG. 5 shows a frequency response characteristic showing a reduced level of spurious noise imparted on a communication resource by the timing signal shown in FIG. 4, in accordance with the present invention.

FIG. 5 shows a frequency response characteristic for the communication resource near the frequencies that correspond to the frequency of timing signal 400. Similar to that of frequency response characteristic 300, noise floor 502 represents a typical noise level present in the system at any given time. Frequency 504 corresponds to the frequency of timing signal 400 and is accompanied by noise spurs at harmonic frequencies 505–507, much like those of timing signal 200. The energy distribution of the noise about these frequencies, however, is in stark contrast to that resulting from the prior art timing signal. That is, the energy imparted onto the communication resource by a strictly periodic timing signal is additive in nature and thereby results in increased energy levels at discrete frequencies corresponding to the period of that timing signal.

By contrast, when the timing signal period is randomly (or even pseudo-randomly) altered, as shown in FIG. 4, the energy is imparted upon the communication resource at random intervals about the nominal period of that timing signal. In particular, by varying the period of subsequent timing pulses by a small amount relative to a nominal timing signal period, the resultant energy imparted on the communication resource is randomly distributed about the frequency corresponding to that nominal period, and harmonics thereof. In this manner, the peak amplitude of the noise spurs for any particular frequency is reduced as illustrated in the frequency ranges 508–511 in FIG. 5. Accordingly, spurious noise peak levels 512–515 are substantially reduced by randomly altering (within predetermined limits) the period of the required timing signal. The resulting peak noise level curve 516 is shown to be substantially reduced from the corresponding curve 316 obtained using the prior art timing signal.

FIG. 6 shows a simplified block diagram of a digital radio communication system that may employ the present invention. Control station 601 communicates with radio 603 via communication resource 605, which might be an RF channel utilizing a conventional modulation scheme, as earlier described. Microprocessor unit 607 (e.g., Motorola Part No. MC68302) executes machine instructions that might be stored in random access memory (RAM) 609 to effect control of audio circuit 610. Audio circuit 610 comprises a digital signal processor (DSP) 611, (e.g., Motorola Part No. MC56002), as well as data devices for interfacing DSP 611 with data sources, such as polling interface 613, and serial interface 615. DSP 611 processes audio signals that are transceived on RF channel 605. Polling interface 613 might be required to poll a push-to-talk (PTT) device located at the control station site. In a preferred embodiment, the polling rate for polling interface 613 is 10 milliseconds. Serial interface 615 might require a control signal for timing serial data being exchanged with a serial port. Accordingly, microprocessor unit 607 might utilize randomly altered timing signal 400 to control polling interface 613 and serial interface 615.

In a preferred embodiment, timing signal 400 is generated at microprocessor unit 607 using a software implemented algorithm. This algorithm consists of utilizing a look-up table for acquiring pseudo-random numbers, which are then used to derive the timing interval for subsequent timing pulses. As earlier discussed, there is a limit to the amount of randomization possible before the timing signal drifts too far from the required nominal period for the device being timed. Accordingly, a range is chosen which can provide the required energy distribution results without comprising the performance of the device being controlled. As an example, polling interface 613 might be controlled by a timing signal having a period which is randomly chosen between 9 and 11 milliseconds. Another consideration is the possibility the randomly generated timing signal will eventually cause the system clock to deviate from real time. Accordingly, the timing signal is reconciled, or re-aligned, with the real-time system clock on an as-needed basis. In a preferred embodiment, this reconciliation occurs every 16 time pulses, as earlier discussed.

Figure 7:
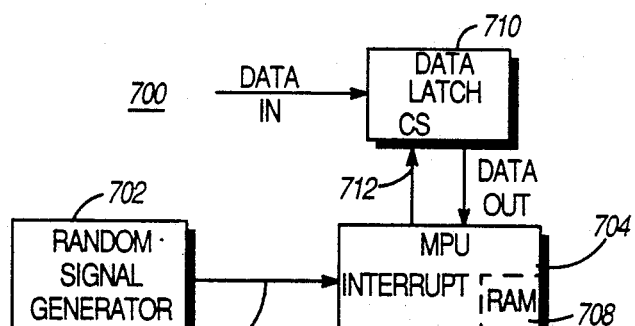
FIG. 7 shows a portion of an audio system that may employ an alternate embodiment of the present invention.
Figure 8:
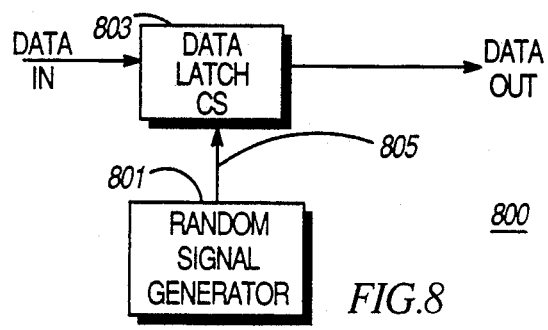
FIG. 8 shows a portion of another audio system that may employ yet another alternate embodiment of the present invention.

FIGS. 7 and 8 represent alternate embodiments of the present invention, which at least partially reflect a hardware implementation of the present invention. FIG. 7 shows a hardware/software combination which can be used to effect the desired result of peak noise level reduction. Random signal generator 702 is used to trigger an interrupt event in microprocessor unit 704, via an interrupt line. Upon receipt of the random timing signal 706, microprocessor unit 704 might execute computer instructions present in RAM 708 to control data latch 710. Data latch 710 includes a chip select (CS) line that can be triggered by timing signal 712, thereby clocking input data through the latch and back into microprocessor unit 704, for example, for further processing.

FIG. 8 shows a random signal generator 801 directly controlling data latch 803. Similar to data latch 710, data latch 803 includes a chip select (CS) line that can be activated by random timing signal 805 to latch the input data, for example, to an external data processor. It should be noted that the hardware implementations might be less susceptible to problems caused by the system clock deviating from real time, since the random signals could be independently generated for each device that required timing. However, the upper- and lower- period limits would still need to be considered, since this is an independent requirement for the device being timed (e.g., data latch, polling interface).

Accordingly, the present invention can be utilized to reduce undesired spurious noise levels present on the communication resource of an audio system. This improvement can be implemented in either a hardware, software, or hardware/software combination. Further, the invention can be implemented with relatively minor hardware, and/or software changes to the prior art systems at minimal cost to the user.

What is claimed is:

1. In an audio system that includes an audio circuit for processing audio signals, a controller for controlling data signals exchanged between a data source and the audio circuit, and a remote audio device, the audio signals being exchanged, via a communication resource, between the audio circuit and the remote audio device, a method of reducing spurious noise levels on the communication resource comprising the steps of:

providing a fixed period system clock;

using the fixed period system clock to generate a timing signal having a randomly altered period;

using the generated timing signal to effect control of the data signals; and re-aligning the randomly altered timing signal with the fixed period system clock after a predetermined number of timing signal pulses.

2. In a controller used for controlling audio signals in a radio communication system that includes an audio signal processor, a remote communication unit, and a communication resource for exchanging audio signals therebetween, the controller using a timing signal to control data signals being exchanged between a data source and the audio signal processor, a method of reducing spurious noise levels imparted on the communication resource substantially by the timing signal, the method comprising the steps of:

providing a fixed period system clock;

using the fixed period system clock to generate the timing signal having a predetermined nominal period;

randomly altering the nominal period of the timing signal between a first predetermined value and a second predetermined value;

using the randomly altered timing signal to effect control of the data signals; and re-aligning the randomly altered timing signal with the fixed period system clock after a predetermined number of timing signal pulses.

3. The method of reducing spurious noise levels as recited in claim 2, wherein the step of randomly altering comprises the step of:

selecting a pseudo-random number between a first predetermined number and a second predetermined number; and using the selected pseudo-random number to vary the period of the timing signal about the predetermined nominal period.

4. The method of reducing spurious noise levels as recited in claim 3, wherein the step of selecting a pseudo-random number comprises the step of using a look-up table stored in the controller.

5. The method of reducing spurious noise levels as recited in claim 2, wherein the step of randomly altering comprises the step of randomly generating the timing signal periodically between the first predetermined value and the second predetermined value.

6. The method of reducing spurious noise levels as recited in claim 2, wherein the step of randomly altering comprises the steps of:

randomly generating a control signal periodically between the first predetermined value and the second predetermined value; and using the randomly generated control signal to trigger an interrupt event in the controller.

7. The method of reducing spurious noise levels as recited in claim 6, further comprising the step of generating the timing signal in response to the triggered interrupt event.

8. A controller for controlling audio signals in a digital radio communication system that includes an audio signal processor, a remote communication unit, and a communication resource for exchanging audio signals therebetween, the controller using a timing signal to control data signals being exchanged between a data source and the audio signal processor, the timing signal imparting spurious noise on the communication resource at frequencies corresponding to the frequency of the timing signal, the controller further using a fixed period system clock for timing system events, the controller comprising:

means for producing the timing signal using the fixed period system clock, such that the timing signal has a predetermined nominal period;

means for randomly altering the nominal period of the timing signal between a first predetermined value and a second predetermined value; and means for effecting control of the data signals by using the randomly altered timing signals; and means for re-aligning the randomly altered timing signal with the fixed period system clock after a predetermined number of timing signal pulses.

9. A controller in accordance with claim 8, wherein the means for randomly altering comprises:

means for providing a set of numbers between a first predetermined value and a second predetermined value, such that each number corresponds to a period value according to a predetermined relationship;

means for pseudo-randomly selecting one from the set of provided numbers; and means for using the pseudo-randomly selected number to vary the period of the timing signal about the nominal period.

10. A controller in accordance with claim 9, wherein the means for providing a set of numbers comprises a look-up table stored in the controller.

* * * * *

UNITED STATES PATENT AND TRADEMARK OFFICE
CERTIFICATE OF CORRECTION

PATENT NO. : 5,249,199

DATED : September 28, 1993

INVENTOR(S) : Glenn N. Mayer et al.

It is certified that error appears in the above-identified patent and that said Letters Patent is hereby corrected as shown below:

On the title page, Item [75]:   replace the last name "Eki" with the name --Ekl--.

Signed and Sealed this

Nineteenth Day of April, 1994

Attest:

BRUCE LEHMAN

Attesting Officer          Commissioner of Patents and Trademarks